United States Patent
Tang et al.

(10) Patent No.: US 9,763,506 B2
(45) Date of Patent: Sep. 19, 2017

(54) CONTACT LENS PACKAGE WITH MICRO-TEXTURED INTERIOR BOWL SURFACE

(75) Inventors: Jia Peng Tang, Singapore (SG); Chea Beng Lee, Singapore (SG)

(73) Assignee: Novartis AG, Basel (CH)

( * ) Notice: Subject to any disclaimer, the term of this patent is extended or adjusted under 35 U.S.C. 154(b) by 371 days.

(21) Appl. No.: 12/909,999

(22) Filed: Oct. 22, 2010

(65) Prior Publication Data

US 2011/0094898 A1 Apr. 28, 2011

(30) Foreign Application Priority Data

Oct. 22, 2009 (SG) ................................. 200907048

(51) Int. Cl.
*A45C 11/00* (2006.01)
*G01M 11/02* (2006.01)

(52) U.S. Cl.
CPC ....... *A45C 11/005* (2013.01); *G01M 11/0214* (2013.01); *G01M 11/0278* (2013.01); *B65D 2585/545* (2013.01)

(58) Field of Classification Search
CPC ............ B65D 2585/545; A45C 11/005; A45C 11/046
USPC ............... 206/5.1; 134/901; 294/1.2; D3/264
See application file for complete search history.

(56) References Cited

U.S. PATENT DOCUMENTS

| | | | |
|---|---|---|---|
| 4,377,329 A | 3/1983 | Poler | |
| 4,392,569 A | 7/1983 | Shoup | |
| 4,691,820 A | 9/1987 | Martinez | |
| 5,054,610 A | 10/1991 | Ajello | |
| 5,409,104 A | 4/1995 | Lovell | |
| 5,467,868 A * | 11/1995 | Abrams et al. | 206/5.1 |
| 5,474,169 A | 12/1995 | Bauman | |
| 5,609,246 A | 3/1997 | Borghorst | |
| 5,936,704 A * | 8/1999 | Gabrielian et al. | 351/160 R |
| 6,050,398 A | 4/2000 | Wilde | |
| 6,889,825 B2 * | 5/2005 | Ichikawa et al. | 206/5.1 |
| 7,225,919 B2 * | 6/2007 | Hamilton | 206/5.1 |
| 7,374,037 B2 * | 5/2008 | Lipscomb et al. | 206/5.1 |
| 7,426,993 B2 * | 9/2008 | Coldrey et al. | 206/5.1 |
| 2003/0057111 A1 * | 3/2003 | Ichikawa et al. | 206/5.1 |
| 2004/0004008 A1 * | 1/2004 | Peck et al. | 206/5.1 |
| 2004/0173211 A1 | 9/2004 | Kladders | |
| 2008/0060950 A1 * | 3/2008 | Peck et al. | 206/5.1 |
| 2008/0105569 A1 * | 5/2008 | Peck et al. | 206/5.1 |
| 2008/0230403 A1 * | 9/2008 | Lipscomb et al. | 206/5.1 |
| 2009/0226668 A1 * | 9/2009 | Simon | 428/143 |

FOREIGN PATENT DOCUMENTS

WO 2004002849 A1 1/2004

OTHER PUBLICATIONS

PCT Invitation to Pay Additional Fees and Communication Relating to the Results of the Partial International Search dated Mar. 22, 2011, International Application No. PCT/B2010/002482, International Filing Date Sep. 30, 2010.

* cited by examiner

*Primary Examiner* — Anthony Stashick
*Assistant Examiner* — Blaine Neway
(74) *Attorney, Agent, or Firm* — Sheng-Hsin Hu

(57) ABSTRACT

A container for a contact lens, having a micro-textured pattern on an interior surface thereof to prevent adherence of the lens to the container. In-container inspection of the lens within the container does not recognize the micro-textured pattern of the container as a defect on the lens.

3 Claims, 3 Drawing Sheets

CONTACT LENS PACKAGE WITH MICRO-TEXTURED INTERIOR BOWL SURFACE

This application claims foreign priority under 35 U.S.C. §119 of Singapore Patent Application No. 200907048-3 filed Oct. 22, 2009, incorporated by reference in its entirety.

TECHNICAL FIELD

The present invention relates generally to packaging for contact lenses, and more specifically to a contact lens blister pack having a textured interior bowl surface for reducing the incidence of surface chip defects on the contact lens.

BACKGROUND

Contact lenses are commonly packaged in blister packs. Blister packs come in many different forms, and typically include a container having a concave bowl or cavity formed therein, and a removable cover adhered over the bowl to retain the contact lens and a dose of saline therein and maintain sterility. The contact lens may be subjected to in-container quality assurance inspection while within the bowl of the container.

Surface chip defects can occur on a contact lens when the front curve of the contact lens adheres to the interior surface of the container's bowl, for example, before the saline dosing process or during autoclaving. The adhesion of the contact lens to the container surface may be so great that small chips are torn off of the front face of the contact lens as the lens detaches from the container, creating surface chip defects.

Surface chip defects sometimes result in a lower quality product, reduced efficiency, and increased manufacturing costs. Accordingly, it can be seen that needs exist in the contact lens manufacturing field for reducing the incidence of surface chip defects.

SUMMARY

In example embodiments, the present invention relates to an improved container for contact lenses that reduces the incidence and/or severity of surface chip defects. One or more micro-textured patterns applied to regions or zones of the interior surface of the container reduce adhesion of the lens. In example forms of the invention, the regions or zones to which the micro-textured patterns are applied are concentric, adjacent, or otherwise configured relative to one another. Transitions between the micro-textured patterns applied to the regions or zones may be smooth and continuous, or alternatively may be discrete or discontinuous.

In one aspect, the present invention relates to a container for a contact lens. The container includes a cavity for receiving the contact lens, the cavity having an interior surface. At least a portion of the interior surface of the cavity has a micro-textured pattern thereon, wherein the micro-textured pattern is formed of a plurality of microstructures, the microstructures having a substantially rounded dome-like configuration.

In another aspect, the invention relates to a container for a contact lens. The container includes a cavity having an interior surface defining first and second zones of microstructure patterns. The first zone includes microstructures having a first configuration and the second zone includes microstructures having a second configuration, wherein the first configuration is different from the second configuration.

In still another aspect, the invention relates to a method of preventing adherence of a contact lens to a contact lens container, the method including applying a micro-textured pattern to an interior surface of the contact lens container.

In another aspect, the invention relates to a method of manufacturing a contact lens container. The method includes the steps of applying an inverse micro-textured pattern to a mold surface of a mold, and forming the contact lens container in the mold and thereby transferring a mirror image of the inverse micro-textured pattern of the mold surface onto the formed contact lens container.

In another aspect, the invention relates to a method of in-container inspection of a contact lens within a contact lens container. The method includes the steps of capturing an image of the contact lens within the container, and analyzing the image of the contact lens to determine whether it contains a lens defect. The contact lens container has an interior surface with a micro-textured pattern applied thereon, and the micro-textured pattern is not indicated as the lens defect in the analysis of the image.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
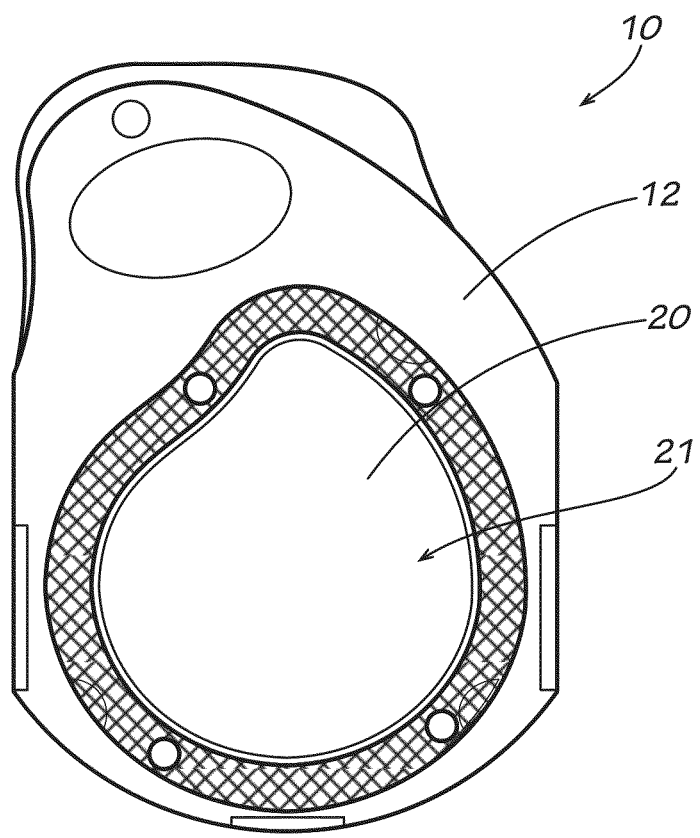
FIG. 1 is a top plan view of a blister pack container for a contact lens according to an example embodiment of the present invention.

With reference now to the drawing figures, wherein like reference numbers represent corresponding parts throughout the several views, FIG. 1 shows a blister pack container 10 for storing a contact lens according to an example embodiment of the invention. U.S. Pat. No. 5,609,246 to Borghorst et al is incorporated herein by reference for additional details regarding the general construction of an example form of blister pack container. It will be understood, however, that the present invention is suitable for application to a variety of different container formats, and is not limited to the particular container styles identified.

The container 10 comprises a body 12 having a generally concave bowl or cavity 20 formed therein. The bowl or cavity 20 has a smoothly curved inner surface 21 for containing the contact lens and a dose of saline therein. An attachment zone is optionally provided on the body 12 surrounding the bowl 20 for releasably attaching a cover sheet (unshown) over the bowl to retain the lens and saline within the bowl and prevent contamination.

Figure 2:
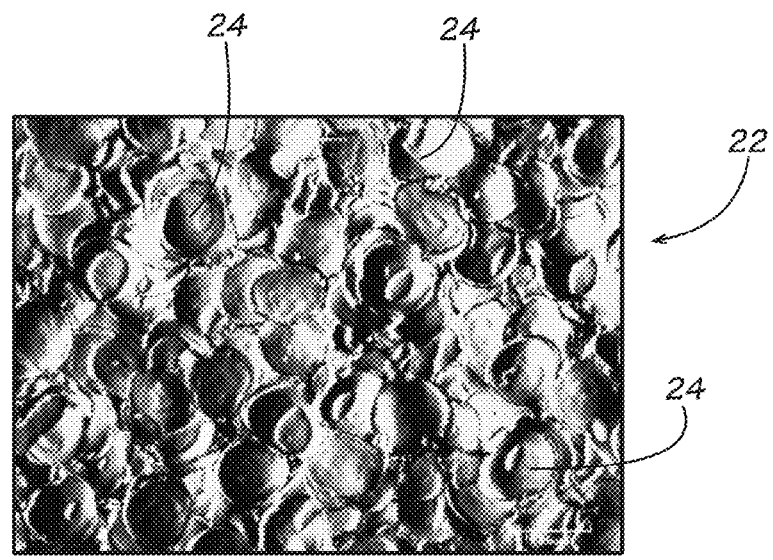
FIG. 2 is a microscopic view of an example form of a micro-textured pattern applied to a container for a contact lens according to an embodiment of the present invention.

The inner surface 21 of the bowl 20 has a micro-texture pattern 22 applied thereon, an example embodiment of which can be seen more clearly in the microscopic view of FIG. 2. In this example embodiment, the micro-texture pattern 22 is a dotted or stippled pattern, comprising a multiplicity of micro-structures 24 having a substantially uniform dome-like or rounded configuration repeated in a generally regular pattern. In this embodiment, the individual micro-structures 24 of the pattern 22 have a diameter or cross-wise dimension of between about 18-24 µm (micrometers) and are generally shaped as a convex dome or mound projecting outwardly from the inner surface 21 of the bowl. The micro-structures 24 are spaced about 18-24 µm from one another, center to center, and optionally can partially overlap one another as seen in FIG. 2. In example embodiments, the inner surface 21 of the bowl 20 has an overall root-mean square (RMS) surface roughness value range between 1-11 µm. In alternate embodiments, a higher or lower RMS surface roughness is provided along one or more portions of the inner surface 21.

In alternate embodiments, the individual micro-structures can take the form of a concavely recessed cup or bowl, angular peaks or ridges, raised flats, and/or other geometric forms; and may be uniform or non-uniform in configuration and distribution along substantially all of the inner surface 21 of the bowl 20, or along one or more portions of the inner surface of the bowl. Preferably, the micro-texture pattern 22 is applied to the inner surface of the bowl at least in the region of the central, lowermost nadir of the bowl 20. The micro-texture pattern 22 can take different forms, including, but not limited to, a wave-like pattern, a jagged pattern, or a grid-like pattern or the like, each pattern formed of a multiplicity of micro-structures that are replicated along at least a portion of the bowl surface to create the pattern.

Optionally, the micro-structures 24 of the micro-texture pattern 22 have different sizes in different regions of the bowl 20. In an example embodiment, the micro-structures 24 near the center of the bowl 20 have a greater diameter of about 24 µm while the micro-structures nearer the peripheral sides of the bowl have a lesser diameter of about 18 µm. The size change of the micro-structures 24 can be gradual and substantially continuous along the extent of the micro-texture pattern 22, or can change from a greater dimension to a smaller dimension at a sharp pattern transition.

In example modes of manufacture according to the present invention, the container 10 is formed by injection molding in a metal mold. The micro-texture pattern 22 on the container 10 can be formed by application of a mirror-image pattern on the mold, which is then transferred onto the container during the molding process; or alternatively the micro-texture pattern can be directly formed on each container. In particular embodiments, the micro-texture pattern 22 is formed by Electrical Discharge Machining (EDM) of the corresponding mold surface that forms the bowl of the blister pack, by shot-peening (for example using microbeads of glass or other material applied at a high velocity to the mold surface) the mold surface, or by other machining or metal forming methods.

Figure 3:
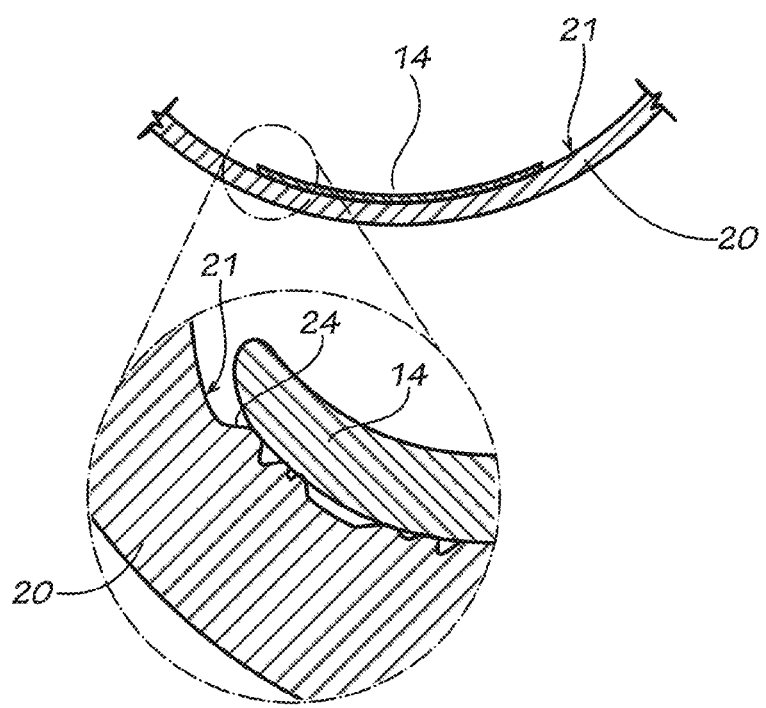
FIG. 3 is a detailed cross sectional view showing the inner bowl surface of a container for a contact lens having a micro-textured pattern applied thereon, and containing a contact lens, according to an embodiment of the present invention.

FIG. 3 shows a side view of a contact lens 14 resting on the surface 21 of the cavity 20, according to an example mode of use of the present invention. The detailed view of FIG. 3 shows the rounded microstructures 24 supporting the contact lens 14 at discrete spaced points along the lens surface, reducing the surface area of contact and reducing the potential for the lens to adhere to the bowl of the container, and thereby reducing or eliminating the incidence of chip formation upon detachment of the lens from the bowl.

Figure 4:
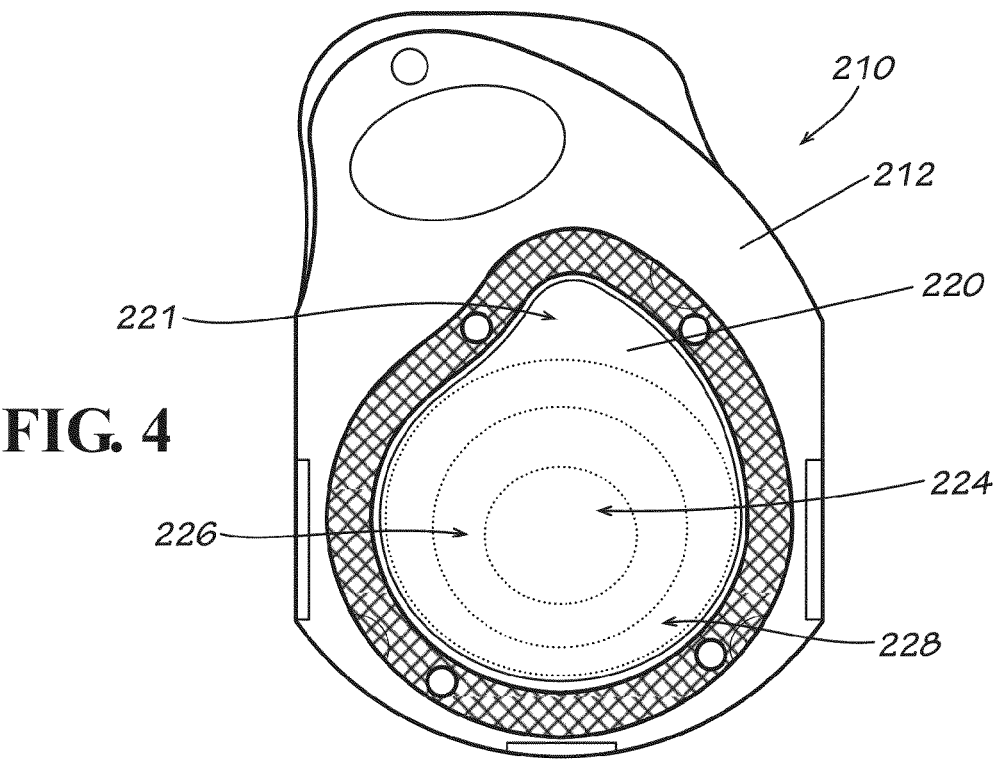
FIG. 4 is a top plan view of a blister pack container for a contact lens according to another example embodiment of the present invention.

FIG. 4 shows a blister pack container 210 according to another embodiment of the invention. The container 210 comprises a body 212 and a bowl or cavity 220 having an inner surface 221. The inner surface 221 comprises a plurality of zones including a center zone 224, a first or inner annular ring zone 226, and a second or outer annular ring zone 228 (all delineated by dashed lines). The center zone 224 is generally positioned in the center of the bowl or cavity 220, having a circular shape with diameter of about 10 mm. The first annular ring zone 226 is positioned concentrically with the center zone. The inner diameter of the first annular ring zone 226 is about 10 mm while the outer diameter of the annular ring zone 26 expands radially about 2 mm, resulting in an outer diameter of about 14 mm. The second annular ring zone 228 is also positioned concentrically with the center zone. The inner diameter of the second annular ring zone 28 is about 14 mm, while the outer diameter of the second annular ring zone 228 is about 20 mm. All three zones are sized to cooperatively cover a large percentage of the area of the surface 221. The zones represent areas or regions on the inner surface 221 of the bowl comprising micro-texture patterns having different RMS surface roughness values or value ranges. For example, the center zone 224 of an embodiment of the invention has an overall RMS surface roughness value of 1.5 µm, the first annular ring zone 226 has a RMS surface roughness value range between 2-4 µm, and the second annular ring zone has a RMS surface roughness value range between 3-11 µm. The areas of the surface 221 not designated by a zone optionally have a RMS surface roughness value range between 1-11 µm. The change in RMS surface roughness from zone to zone can be gradual and substantially continuous across a transition region around the areas indicated by the broken lines, or can be abrupt wherein the broken lines represent a discrete transition. The dimensions and layout of the zones for this embodiment are exemplary and not limiting of the scope of the invention, and one skilled in the art would appreciate that depending on the size of the bowl 220, the dimensions of the zones, as well as the RMS surface roughness values or value ranges, could differ from the specified values.

Figure 5:
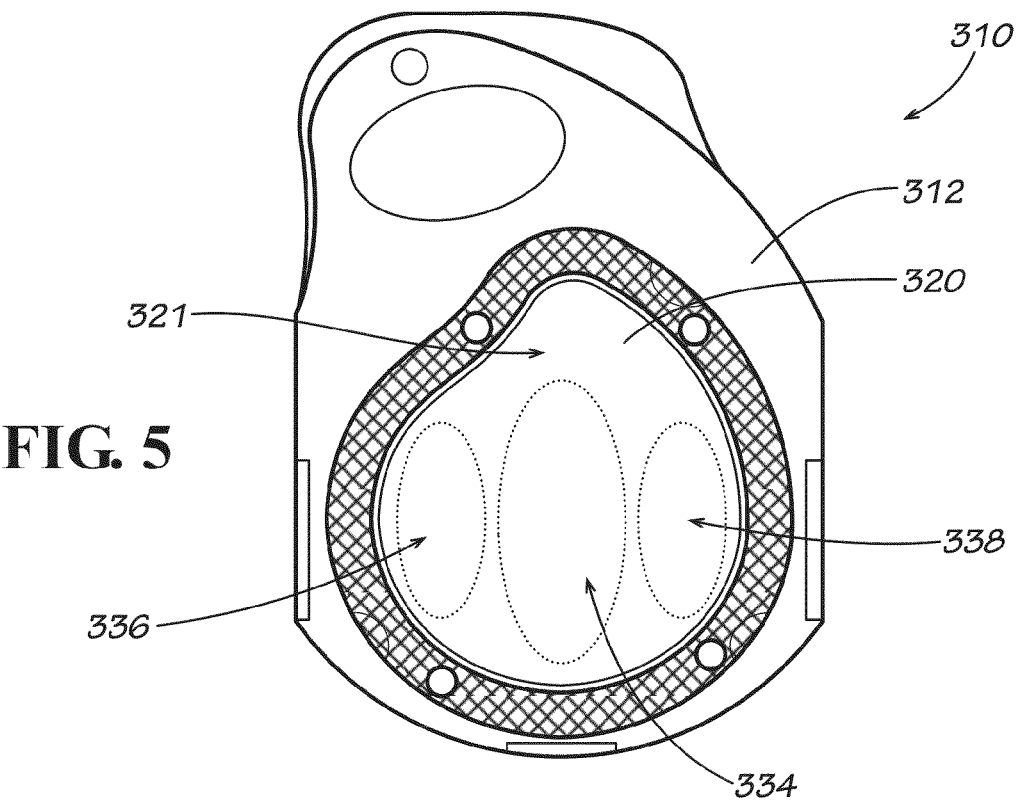
FIG. 5 is a top plan view of a blister pack container for a contact lens according to still another example embodiment of the present invention.

FIG. 5 shows a blister pack container 310 according to another embodiment of the present invention. The container 310 comprises a body 312 and a bowl or cavity 320 having an inner surface 321 thereon, said surface 321 comprising a plurality of zones. The plurality of zones include a center zone 334, a first side zone 336, and a second side zone 338 (all delineated by dashed lines). The zones represent areas on the surface 321 having a micro-texture pattern that has a specified RMS surface roughness value or value range that differs from a surrounding surface and/or that differs from another zone. For example, in a particular embodiment of the invention, the center zone 334 has an overall RMS surface roughness value range between 1-1.9 µm; and the first side zone 336 and the second side zone 338 have an overall RMS surface roughness value range between 3-11 µm, and more preferably between 4-8 µm. In this embodiment, the zones 334, 336, and 338 are generally elliptical in shape, with the major axes of the ellipses generally aligned. The center zone 334 is centered within the cavity 320 and larger than the side zones, while the first side zone 336 and second side zone 338 are positioned adjacent to and along either side of the center zone 334. Each zone is sized to each cover roughly 25% of the cavity 320. The areas of the surface 321 not designated by a zone optionally have a RMS surface roughness value range of 1-11 µm. The change in RMS surface roughness from zone to zone, or from a zone to an area not designated by a zone can be gradual or abrupt. The layout of the zones for this embodiment are exemplary and not limiting of the scope of the invention, and the size, configurations and layout of the zones, as well as the RMS surface roughness values or value ranges of the zones, may differ depending on the intended application.

The present invention further comprises a method for performing an In-Package Inspection (IPI) of a contact lens while it is housed within the bowl of a blister pack container. In an example inspection method according to the present invention, a light source is directed towards the blister pack and a camera captures an image of the cavity with the contact lens resting therein using the light source as a backdrop. The light source illuminates any possible surface defects on the contact lens, which images of which are then captured on image by the camera. The top face of the blister pack will be understood to be the view represented by FIG. 1. The light source can be shone upon the top, bottom, or side faces of the blister pack. One method of conducting the IPI is by having a light source placed above the blister pack and capturing an image of the bottom of the cavity. Another method of conducting the IPI is by having a light source placed below the blister pack and capturing an image of the top of the cavity. Still another example method would be to have the light source placed either below or above the blister pack and capturing an image of either the top or the bottom of the cavity. Still another method of inspection would be to have the light source placed above, below or on either side of the blister pack and capturing an image of the opposite side of the blister pack. The captured image(s) can be analyzed by visual inspection or by computerized inspection algorithms.

In order for the IPI to be carried out successfully, a certain amount of light transmittance percentage through the container bowl is desirable, since the IPI process utilizes light to inspect the contact lens. Accordingly, the container is optionally formed of a transparent or translucent material. The specified configurations of the micro-texture pattern on the surface result in relatively little or no negative impact upon the yield and inspection efficiency of the In-Packaging Inspections. More specifically, the light transmittance through the cavity is maintained at a percentage suitable for inspection, even with the presence of the micro texture pattern. Expected adverse effects due to the presence of the micro-texture pattern, such as light scattering or light reflecting, are not found to interfere with the IPI process, and the micro-texture pattern is not recognized as a surface defect. In alternate modes of inspection according to the present invention, computerized inspection algorithms may account for the micro-texture surface pattern and filter it out of the inspection analysis.

While the invention has been described with reference to preferred and example embodiments, it will be understood by those skilled in the art that a variety of modifications, additions and deletions are within the scope of the invention, as defined by the following claims.

What is claimed is:

1. A container for a contact lens, comprising:
a cavity for receiving the contact lens, the cavity having an interior surface, wherein the interior surface of the cavity comprises a plurality of zones, each zone having microstructures of different dimensions thereon; wherein the microstructures having a substantially rounded dome-like configuration, wherein the plurality of zones comprise a first elliptical zone and a second elliptical zone, the first and second elliptical zones each defining a generally elliptical outer periphery, major axes of the generally elliptical outer peripheries of the first and second elliptical zones being aligned generally parallel to one another.

2. The container of claim 1, further comprising a third elliptical zone, the second and third elliptical zones being arranged on opposite sides of and being smaller than the first elliptical zone.

3. The container of claim 1, wherein the first elliptical zone has an overall root mean square surface roughness of about 1-1.9 µm, and the second elliptical zone has an overall root mean square surface roughness of about 3-11 µm.

* * * * *